(12) United States Patent
Freund et al.

(10) Patent No.: US 9,262,607 B1
(45) Date of Patent: Feb. 16, 2016

(54) PROCESSING USER INPUT CORRESPONDING TO AUTHENTICATION DATA

(71) Applicant: Google Inc., Mountain View, CA (US)

(72) Inventors: Martin Brandt Freund, Mountain View, CA (US); Yuanying Xie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/037,307

(22) Filed: Sep. 25, 2013

(51) Int. Cl.
*G06F 21/00* (2013.01)
*G06F 21/31* (2013.01)

(52) U.S. Cl.
CPC ........................ *G06F 21/31* (2013.01)

(58) Field of Classification Search
USPC .............................................................. 726/7
See application file for complete search history.

(56) References Cited

U.S. PATENT DOCUMENTS

| | | | | |
|---|---|---|---|---|
| 4,500,964 | A * | 2/1985 | Nickle | 714/46 |
| 5,710,901 | A * | 1/1998 | Stodghill et al. | 715/710 |
| 6,636,990 | B1 * | 10/2003 | Wadewitz | 714/48 |
| 2003/0023476 | A1 * | 1/2003 | Gainey | 705/10 |
| 2004/0050929 | A1 * | 3/2004 | Fayfield | 235/380 |
| 2007/0088732 | A1 | 4/2007 | Chen et al. | |
| 2009/0165100 | A1 * | 6/2009 | Sasamura et al. | 726/5 |
| 2011/0218980 | A1 * | 9/2011 | Assadi | 707/700 |
| 2012/0117036 | A1 * | 5/2012 | Lester et al. | 707/692 |
| 2012/0169856 | A1 * | 7/2012 | Ahmed | 348/61 |
| 2013/0133062 | A1 | 5/2013 | Boss et al. | |
| 2013/0152158 | A1 * | 6/2013 | Yoshihama | 726/1 |
| 2014/0096059 | A1 * | 4/2014 | Hauser et al. | 715/771 |

OTHER PUBLICATIONS

Linux Defenders et al., "Security Hardware Password Manager", IP.com Prior Art Database Technical Disclosure, Mar. 20, 2009, pp. 1-6.
"Application-Driven Method to Obfuscate Sensitive Data Submission to Avoid Keylogging", IP.com Prior Art Database Technical Disclosure, Aug. 16, 2011, pp. 1-3.

* cited by examiner

*Primary Examiner* — Mahfuzur Rahman
(74) *Attorney, Agent, or Firm* — McDermott Will & Emery LLP

(57) ABSTRACT

A system and machine-implemented method for processing user input. User input by a user is received within a first input field. An authentication entry, for authenticating the user via a second input field, is accessed from a database. The received user input is compared with the authentication entry. Based on the comparison, a determination is made that the received user input matches the authentication entry. In response to the determination, a notification that the first input field is incorrect for the user input is provided.

19 Claims, 5 Drawing Sheets

PROCESSING USER INPUT CORRESPONDING TO AUTHENTICATION DATA

BACKGROUND

The present disclosure generally relates to authentication data, and in particular, to processing user input corresponding to authentication data.

Applications (e.g., web applications) can include multiple fields for user input. For example, an online form may include input boxes for a user to enter username, password or other information for authenticating the user.

SUMMARY

The disclosed subject matter relates to a computer-implemented method of processing user input. The method comprises receiving user input by a user within a first input field, and accessing, from a database, an authentication entry for authenticating the user via a second input field. The method further comprises comparing the received user input with the authentication entry, and determining, based on the comparison, that the received user input matches the authentication entry. In addition, the method comprises providing, in response to the determination, a notification that the first input field is incorrect for the user input.

The disclosed subject matter further relates to a system for processing user input. The system comprises one or more processors, and a machine-readable medium comprising instructions stored therein, which when executed by the processors, cause the processors to perform operations comprising receiving user input by a user within a first input field. The operations further comprise accessing, from a database, an authentication entry for authenticating the user via a second input field, and comparing the received user input with the authentication entry. In addition, the operations comprise determining, based on the comparison, that the received user input matches the authentication entry, and providing, in response to the determination, a notification that the first input field is incorrect for the user input. The user input corresponds to partial entry of the authentication entry, and the determining comprises determining that the partial entry matches a corresponding part of the authentication entry.

The disclosed subject matter also relates to a machine-readable medium comprising instructions stored therein, which when executed by a system, cause the system to perform operations comprising receiving user input by a user within a first input field. The operations further comprise accessing, from a database, an authentication entry for authenticating the user via a second input field, and comparing the received user input with the authentication entry. In addition, the operations comprise determining, based on the comparison, that the received user input matches the authentication entry, and providing, in response to the determination, a notification that the first input field is incorrect for the user input, wherein the notification is based on a level of uniqueness for the authentication entry.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Applications (e.g., web applications) can include multiple fields for user input. For example, an online form may include input boxes for a user to enter username, password or other information for authenticating the user.

There are cases when a user is attempting to type in a password and mistakenly types it in the incorrect field (e.g., by pressing the tab button too many times, or by thinking that the incorrect window is active). This attempted entry within the incorrect field can create security problems. For example, the password can be seen in plain text everywhere. In addition, the password may be recorded in the log files of an application, if the user enters "submit" with the password in the incorrect field. Thus, it may be desirable to reduce the likelihood of a user entering a password within the incorrect field.

The subject technology provides for processing user input corresponding to authentication data (e.g., a password). User input is received within a first input field. An authentication entry for authenticating the user via a second input field is accessed from a database (e.g., where the database stores usernames and passwords for different websites or applications). The received user input is compared with the authentication entry. Based on the comparison, a determination is made that the received user input matches the authentication entry. In response to the determination, a notification that the first input field is incorrect for the user input is provided for the user.

Figure 1:
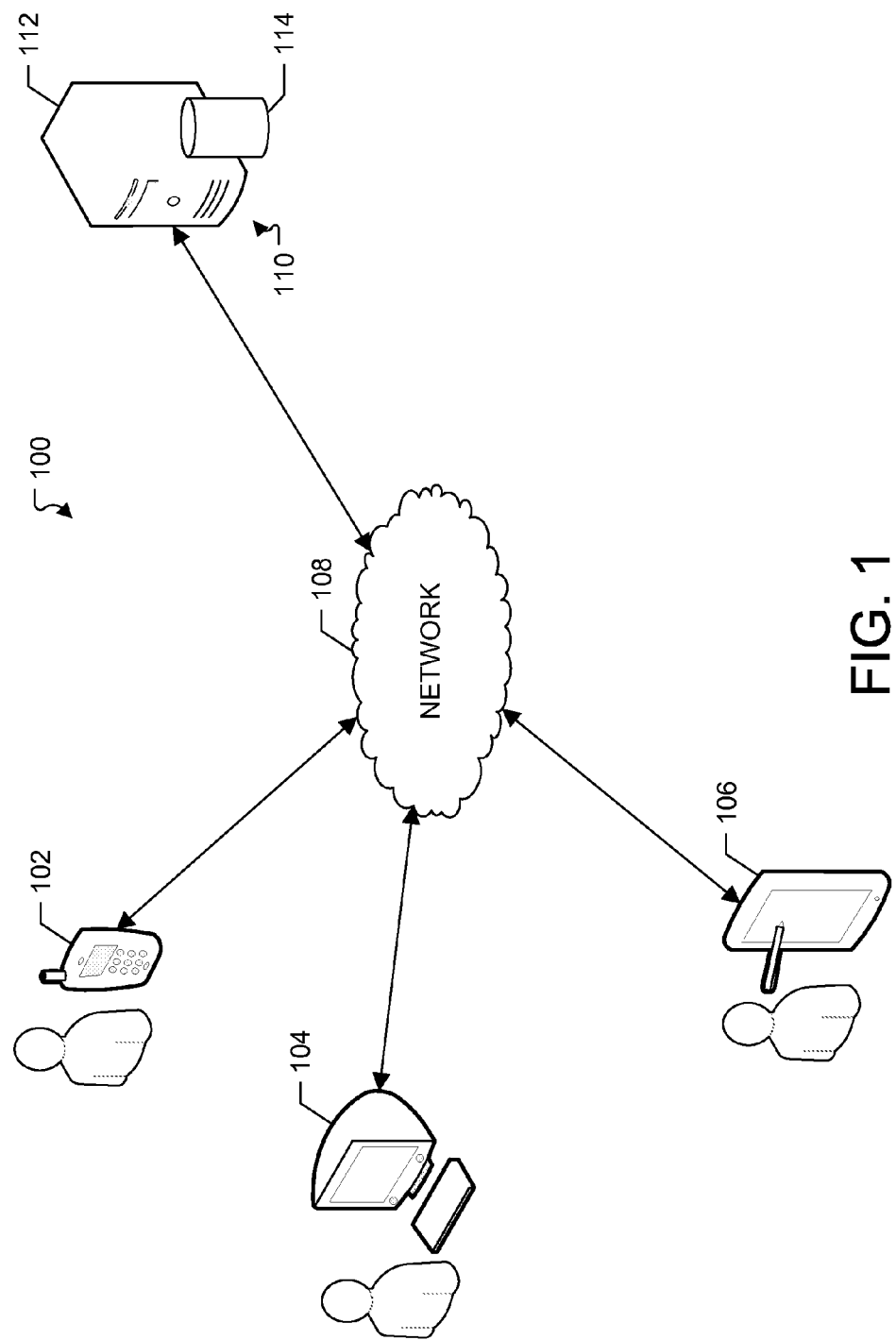
FIG. 1 illustrates an example network environment which can provide for processing user input corresponding to authentication data.

FIG. 1 illustrates an example network environment which can provide for processing user input corresponding to authentication data. A network environment 100 includes computing devices 102, 104 and 106 (hereinafter "102-106") and computing system 110. Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, any of computing devices 102-106 provide for processing user input corresponding to authentication data. The computing device receives user input by a user within a first input field (e.g., a username input box of an application). The computing device accesses, from a database (e.g., locally stored on the computing device or remotely stored on a server such as server 100), one or more authentication entries for authenticating the user via a second input field (e.g., a password input box of an application). For example, the one or more authentication entries can be for logging the user into the computing device (e.g., 102-106), or for authenticating the user onto an application (e.g., a website) hosted by a server (e.g., 110).

The computing device compares the received user input with the authentication entry, and determines, based on the comparison, that the received user input matches the authentication entry. In response to the determination, the computing device provides a notification that the first input field is incorrect for the user input. The notification can be provided in different manners, including but not limited to, a message indicating that the first input field is incorrect for the user input, encrypting the display of additional user input within the first input field (e.g., with "*" characters), and/or preventing additional user input within the first input field.

Figure 2A:
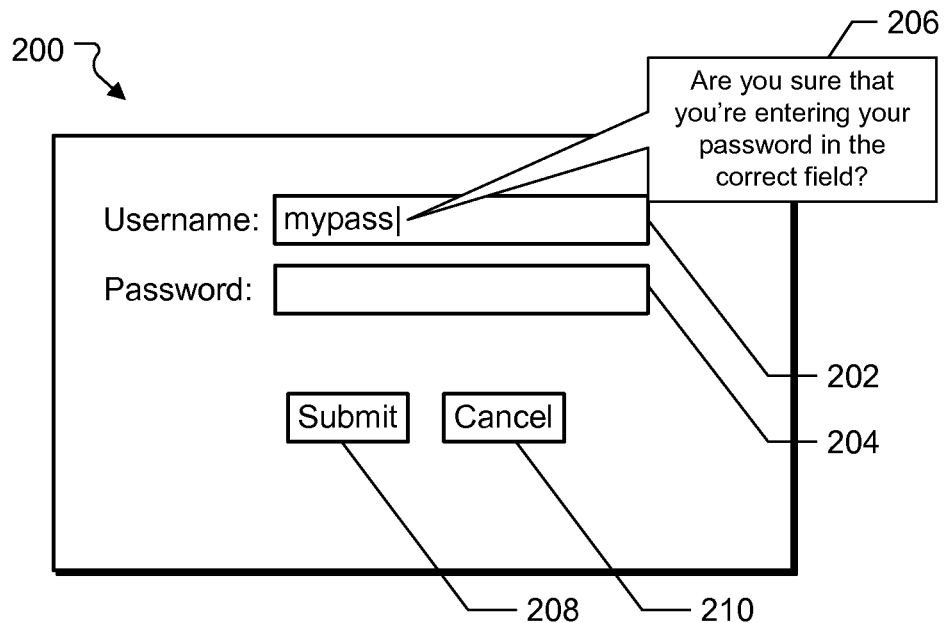
FIGS. 2A-C illustrate examples of notifying a user of incorrect user input within an input field.
Figure 2B:
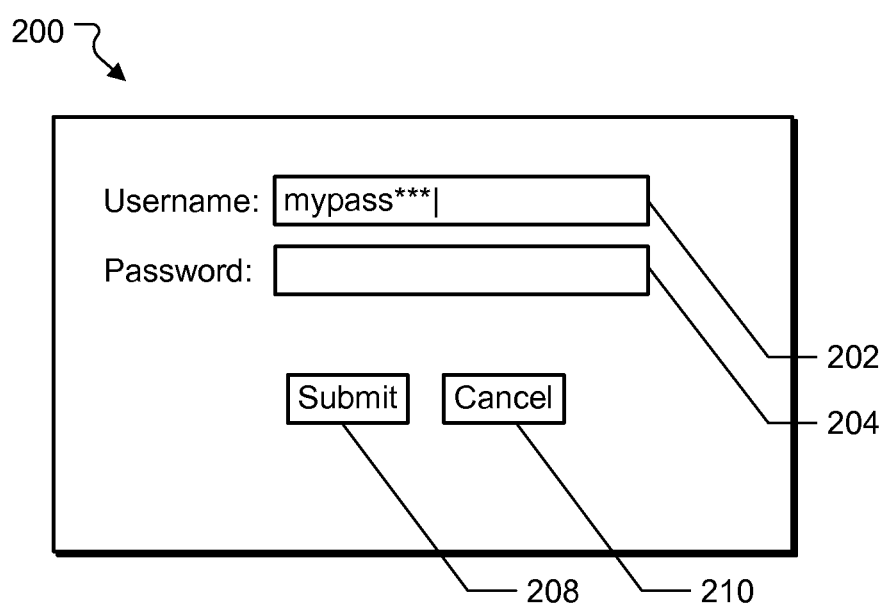
Figure 2C:
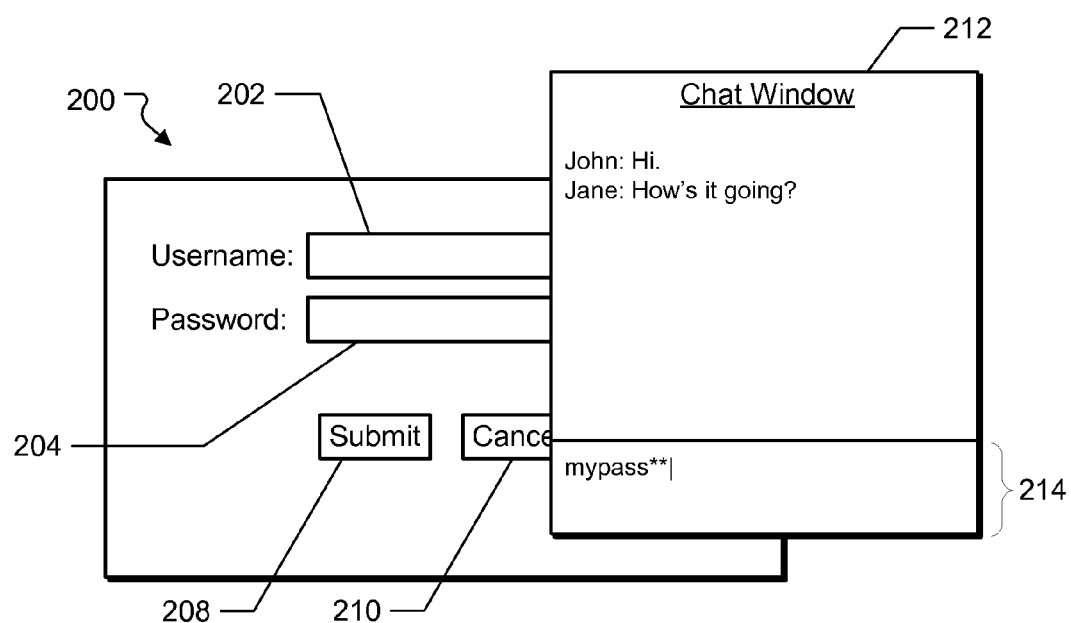

FIGS. 2A-C illustrate examples of notifying a user of incorrect user input within an input field. In the example of FIGS. 2A-2C, two input boxes 202 and 204 are displayed within user interface 200, for example, to authenticate a user. Input box 202 is a username field and input box 204 is a password field. Although user interface 200 includes two input boxes, the subject technology can be applied to interfaces with more than two input boxes.

Examples of user interfaces with input boxes for authenticating a user include, but are not limited to, interfaces for: locking/unlocking a computing device (e.g., any of computing devices 102-106), logging into a website hosted by a server (e.g., server 110), or conducting transactions (e.g., financial transactions). The authentication data can include, but is not limited to, username/password information, contact information, history information, or other information for authenticating a user.

In FIG. 2A, input box 204 is configured to receive user input corresponding to a password. In this example, the user's password is "mypassword." The user in this case inadvertently begins to type the password within input box 202. For example, the user may have pressed the tab button too many times, causing input box 202 instead of input box 204 to be active for receiving user input. This attempted entry by the user within the incorrect field can create security problems. For example, the password can be seen in plain text everywhere. In addition, if the user enters "submit" (e.g., by clicking button 208) with the password in the incorrect field, the password may be recorded in the log files of an application.

To reduce this security risk, the computing device (e.g., any of computing devices 102-106) can detect when an authentication entry (e.g., a password or other type of authentication input) is being entered within an incorrect input field. In this regard, the computing device can access a database of authentication entries, and compare those authentication entries with user input entered within input fields.

For example, the database of authentication entries can store usernames and passwords for different websites or applications. As noted above, these usernames and passwords can be for authentication on local applications (e.g., for unlocking the computing device or logging into a local application) or on remote applications (e.g., for logging into a website). Moreover, the database of authentication entries can correspond to a local database (e.g., locally stored on computing device 102-106), or to a remote database, for example, stored on a server in association with a user profile for that user (e.g., stored on a remote server and accessible via computing device 102-106).

In addition to usernames and passwords, the database of authentication entries can store other information for authenticating a user including, but not limited to, financial information (e.g., credit card data), contact information (e.g., home and work addresses) and history information (e.g., past places of work, academic institutions). The database can store the authentication entries in association with the applications (e.g., websites) which require this information. In example aspects, the database can store all or part of its information in an encrypted format.

When user input is received within an input box (e.g., input box 202), the computing device can access the database of authentication entries, and compare those authentication entries with the user input. If the user input matches, or partially matches, the authentication entry, the computing device notifies the user that the input box is incorrect for the user input.

In the example of FIG. 2A, the notification for the user is in the form of a message 206. Message 206 indicates that the user may be entering the password in the incorrect field. At this point, the user can decide how to respond to message 206. For example, the user's username may consist or partially consist or partially consist of the term "mypass," suggesting that the user input is correct. Thus, the user may continue with text entry within input box 202. However, the user may agree that "mypass" is being incorrectly entered within input box 202, and can cancel (e.g., via "cancel" button 210) or can clear the text from input box 202 and continue with the correct username/password pair before clicking "submit" button 208.

FIG. 2B illustrates another example of notifying a user of incorrect user input within an input field of an application. As an alternative (or addition) to displaying message 206, the computing device can encrypt further entry of user input within input box 202. In the example of FIG. 2B, additional characters are displayed as "*" symbols within input box 202. It should be noted that characters other than "*" can be used. In example aspects, characters can be randomly assigned using a random-character generation algorithm. In addition, the computing device may not necessarily display a single additional character as each additional character is input by the user. Rather, the length of the displayed additional character string may differ from the length of additional characters entered by the user (e.g., to obfuscate the authentication data and further enhance security).

In addition or as an alternative to notifying the user via a message (e.g., message 206) or encrypted characters, computing device can simply disable additional user input within input box 202. For example, when the computing device detects entry of authentication data within the incorrect input field, the computing device can prohibit any entry of user input within that field (e.g., all text entry). Alternatively, the computing device can only prohibit the user from submitting any entered text (e.g., by disabling "submit" button 208 or keys associated with submitting such as the "enter" key), but can otherwise continue permitting entry of text within the incorrect input field.

With reference to FIG. 2C, it should be noted that incorrect user input is not necessarily limited to input fields within the same application. In the example of FIG. 2C, the computing device detects that user input corresponding to an authentication entry (e.g., a password) is being entered within a different application. For example, while user interface 200 of an application requires input of a username and password, another application (e.g., a chat application) may be running on the computing device. The user may enter, or partially enter, the password intended for input box 204 within a chat window 212. More specifically, the user may enter such input within a chat input box 214 of chat window 212.

The computing device can detect the entry of the authentication data within the incorrect application, and notify the user that chat input box 214 is the incorrect field for such authentication data. In the example of FIG. 2C, the computing device detects entry of "mypass" within chat input box 214 of chat window 212, and provides notification via encrypted display of additional characters. However, with respect to entry of authentication data within the incorrect application, the notification is not limited to encryption, and can include a notification message (e.g., similar to message 206) or the disabling/prohibiting of additional user input (e.g., all user input, or the "submit" key).

With reference to FIGS. 2A-2C, the user input can correspond to partial entry of the authentication entry, and the computing device can determine that the partial entry matches a corresponding part of the authentication entry. In example aspects, the computing device can further determine a level of uniqueness for the authentication entry. The level of uniqueness can be used by the computing device to control behavior of the user interface (e.g., user interface 200).

For example, a size of the partial entry can be determined based on the determined level of uniqueness for the authentication entry. In this regard, if the password is extremely strong and unique (e.g., password="4^r&d5g"), then the size of the partial entry can be set at 2-3 characters, since it is unlikely that the user actually intended to type those characters in. However, if the password is weaker or more common (e.g., password="basketball"), the size of the partial entry can be set at 4-5 characters.

Thus, for FIG. 2A, message 206 can be displayed after user entry of 2-3 characters (e.g., "myp") or 4-5 characters (e.g., "mypas"), based on the determined level of uniqueness for the password "mypassword." Likewise, for FIGS. 2B-2C, the encryption of additional data can apply after user entry of 2-3 characters (e.g., "myp") or 4-5 characters (e.g., "mypas"), based on the determined level of uniqueness for the password "mypassword."

In addition, the type(s) of the notification for the user can be based on the level of uniqueness for the authentication entry. For example, if the password is strong and unique, the notification can include display of a message (e.g., message 206), and preventing the user from entering an additional input within the first input field. However, if the password is weak or more common, the notification may correspond to a display of a message without preventing or otherwise obscuring user input (e.g., with "*" symbols, as shown in FIGS. 2B-2C).

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Thus, the user may have control over how information is collected about the user and used by a content server.

Figure 3:
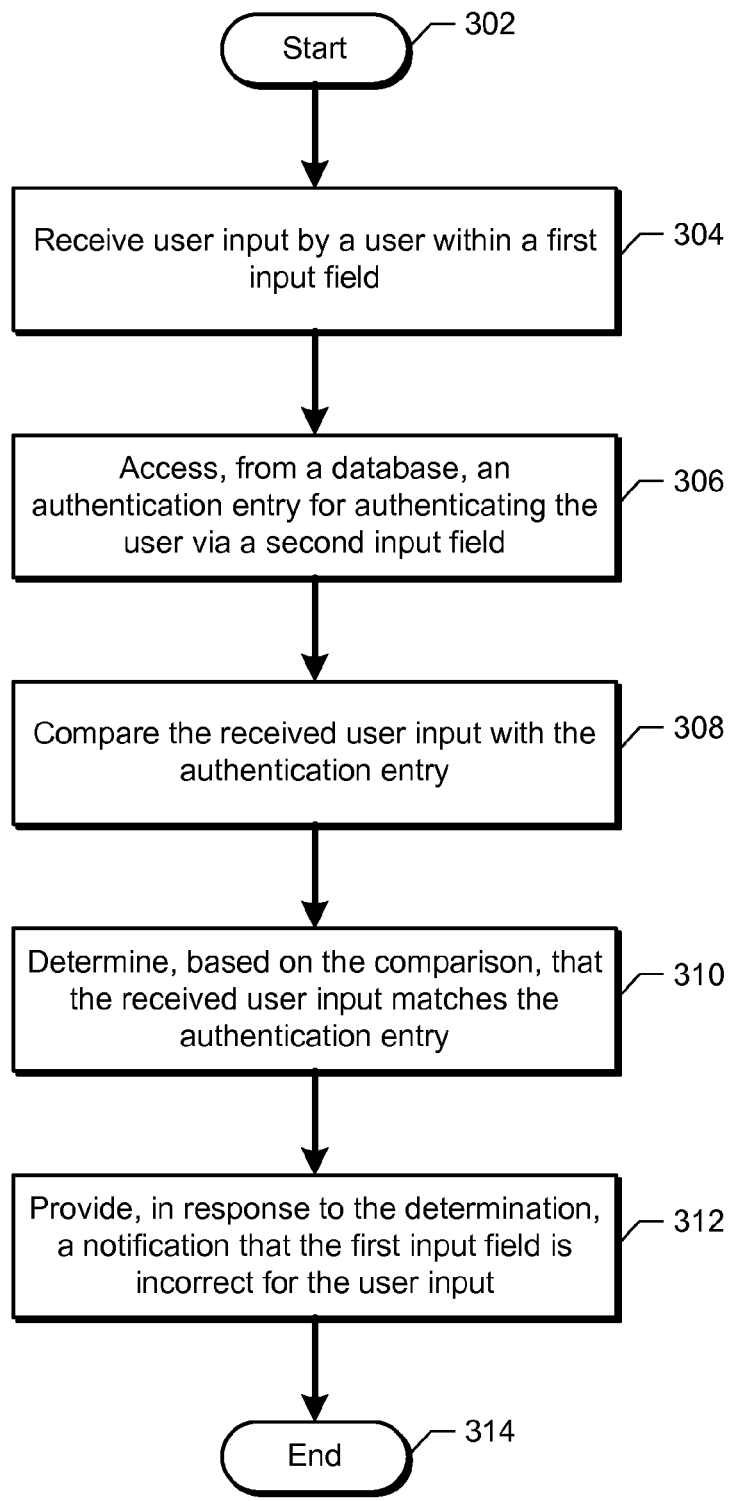
FIG. 3 illustrates an example process by which user input corresponding to authentication data is processed.

FIG. 3 illustrates an example process by which user input corresponding to authentication data is processed. Following start block 302, user input by a user is received within a first input field at block 304.

At step 306, an authentication entry for authenticating the user via a second input field is accessed from a database. The first input field and the second input field can be within a same application, or can be within different applications. At step 308, the received user input is compared with the authentication entry.

At step 310, a determination is made that the received user input matches the authentication entry based on the comparison. The user input can correspond to partial entry of the authentication entry, and the determining can include determining that the partial entry matches a corresponding part of the authentication entry.

A level of uniqueness for the authentication entry can be determined. A size of the partial entry can be determined based on the determined level of uniqueness for the authentication entry. Alternatively, or in addition, a type of the notification can be based on the level of uniqueness for the authentication entry.

At step 312, a notification that the first input field is incorrect for the user input is provided in response to the determination. Providing the notification can include displaying a message indicating that the first input field is incorrect for the user input. Alternatively, or in addition, the notification can include comprises encrypting the display of additional user input within the first input field.

Providing the notification can include preventing additional user input within the first input field. For example, preventing additional user input can include preventing the user from entering any additional user input in the first input field. In another example, preventing additional user input can include comprises preventing the user from entering a submit button or key in association with the first input field.

Figure 4:
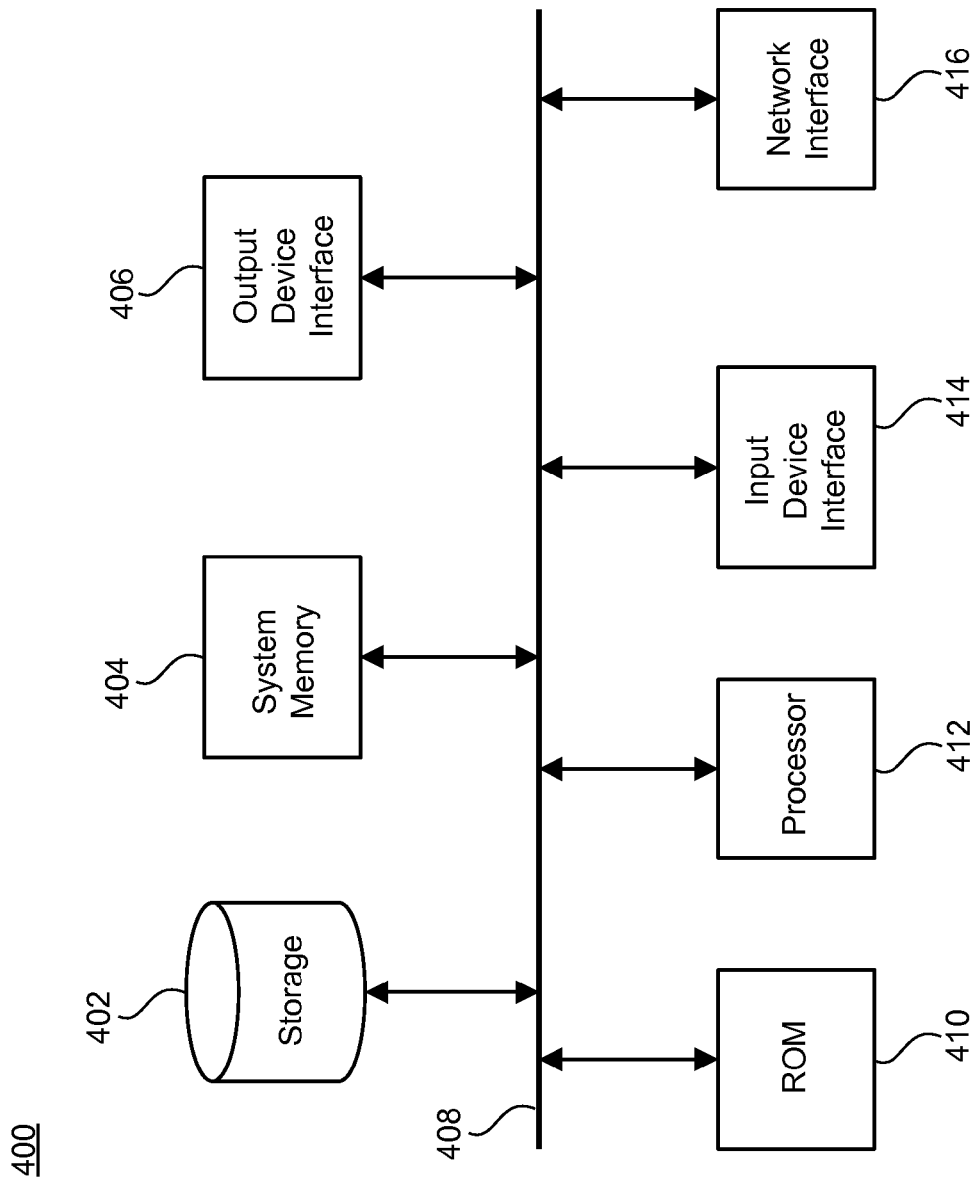
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for processing user input. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of processing user input, the method comprising the following computer-implemented steps:
   displaying a user interface including a first input field and a second input field;
   receiving, via the user interface, user input by a user within the first input field;
   accessing, from a database and in response to receiving the user input, an authentication entry for authenticating the user via the second input field;
   comparing the received user input with the authentication entry;
   determining, based on the comparison, that the received user input matches the authentication entry and was intended by the user for entry within the second input field rather than the first input field; and
   providing, via the user interface and in response to the determination, a notification in real-time that the first input field is incorrect for the user input,
   wherein providing the notification comprises encrypting the display of additional user input within the first input field.

2. The method of claim 1, wherein providing the notification comprises displaying a message indicating that the first input field is incorrect for the user input.

3. The method of claim 1, wherein providing the notification comprises preventing additional user input within the first input field.

4. The method of claim 3, wherein preventing additional user input comprises preventing the user from entering any additional user input in the first input field.

5. The method of claim 3, wherein preventing additional user input comprises preventing the user from entering a submit button or key in association with the first input field.

6. The method of claim 1, wherein the user input corresponds to partial entry of the authentication entry, and wherein the determining comprises determining that the partial entry matches a corresponding part of the authentication entry.

7. The method of claim 6, further comprising:
   determining a level of uniqueness for the authentication entry.

8. The method of claim 7, wherein a type of the notification is based on the level of uniqueness for the authentication entry.

9. The method of claim 1, wherein the first input field and the second input field are within a same application.

10. The method of claim 1, wherein the first input field and the second input field are within different applications.

11. A computer-implemented method of processing user input, the method comprising the following computer-implemented steps:
    receiving user input by a user within a first input field;
    accessing, from a database and in response to receiving the user input, an authentication entry for authenticating the user via a second input field;
    comparing the received user input with the authentication entry;
    determining, based on the comparison, that the received user input matches the authentication entry;
    providing, in response to the determination, a notification that the first input field is incorrect for the user input,
    wherein the user input corresponds to partial entry of the authentication entry, and wherein the determining comprises determining that the partial entry matches a corresponding part of the authentication entry; and
    determining a level of uniqueness for the authentication entry,
    wherein a size of the partial entry is determined based on the determined level of uniqueness for the authentication entry.

12. A system for processing user input, the system comprising:
    one or more processors; and
    a non-transitory machine-readable medium comprising instructions stored therein, which when executed by the processors, cause the processors to perform operations comprising:
      displaying a user interface including a first input field and a second input field;
      receiving, via the user interface, user input by a user within the first input field;
      accessing, from a database and in response to receiving the user input, an authentication entry for authenticating the user via the second input field;
      comparing the received user input with the authentication entry;
      determining, based on the comparison, that the received user input matches the authentication entry and was intended by the user for entry within the second input field rather than the first input field; and
      providing, via the user interface and in response to the determination, a notification in real-time that the first input field is incorrect for the user input,
      wherein the user input corresponds to partial entry of the authentication entry, and
      wherein the determining comprises determining that the partial entry matches a corresponding part of the authentication entry.

13. The system of claim 12, wherein providing the notification comprises displaying a message indicating that the first input field is incorrect for the user input.

14. The system of claim 12, wherein providing the notification comprises encrypting the display of additional user input within the first input field.

15. The system of claim 12, wherein providing the notification comprises preventing additional user input within the first input field.

16. The system of claim 15, wherein preventing additional user input comprises preventing the user from entering any additional user input in the first input field.

17. The system of claim 15, wherein preventing additional user input comprises preventing the user from entering a submit button or key in association with the first input field.

18. The system of claim 12, the operations further comprising:
   determining a level of uniqueness for the authentication entry.

19. A non-transitory machine-readable medium comprising instructions stored therein, which when executed by a system, cause the system to perform operations comprising:
   displaying a user interface including a first input field and a second input field;
   receiving, via the user interface, user input by a user within the first input field;
   accessing, from a database and in response to receiving the user input, an authentication entry for authenticating the user via the second input field;
   comparing the received user input with the authentication entry;
   determining, based on the comparison, that the received user input matches the authentication entry and was intended by the user for entry within the second input field rather than the first input field; and
   providing, via the user interface and in response to the determination, a notification in real-time that the first input field is incorrect for the user input, wherein the notification is based on a level of uniqueness for the authentication entry,
   wherein providing the notification comprises preventing additional user input within the first input field.

* * * * *